United States Patent [19]

Bane

[11] Patent Number: 5,393,179
[45] Date of Patent: Feb. 28, 1995

[54] ANCHOR WITH DRIVE PIN AND THREADABLE BOLT

[76] Inventor: Robert F. Bane, 159 E. 7th St., Hialeah, Fla. 33010

[21] Appl. No.: 199,456

[22] Filed: Feb. 22, 1994

[51] Int. Cl.⁶ .................... F16B 13/06; F16B 37/04
[52] U.S. Cl. .................... 411/60; 411/41; 411/183
[58] Field of Search ............ 411/41, 60, 61, 55, 411/183, 45, 57

[56] References Cited

U.S. PATENT DOCUMENTS

| | | |
|---|---|---|
| 1,000,715 | 8/1911 | Caywood .................. 411/60 |
| 2,784,636 | 3/1957 | Bohmer . |
| 3,171,321 | 3/1965 | Pischer . |
| 3,461,772 | 8/1969 | Barry . |
| 3,516,324 | 6/1970 | Berner . |
| 3,861,270 | 1/1975 | Ernst et al. .............. 411/60 |
| 4,235,151 | 11/1980 | Udert et al. ............. 411/60 |
| 4,602,902 | 7/1986 | Herb ....................... 411/45 |
| 4,614,471 | 9/1986 | Mauritz ................... 411/21 |
| 4,653,132 | 3/1987 | Yamada .................. 411/60 |
| 4,662,808 | 5/1987 | Camilleri ................ 411/340 |
| 4,760,843 | 8/1988 | Fischer et al. .......... 128/92 |
| 4,968,199 | 11/1990 | Haage et al. ........... 411/60 X |

FOREIGN PATENT DOCUMENTS

| | | | |
|---|---|---|---|
| 2617212 | 11/1977 | Germany ................ | 411/60 |
| 617150 | 2/1949 | United Kingdom ..... | 411/60 |
| 889126 | 2/1962 | United Kingdom ..... | 411/60 |
| 1434183 | 5/1976 | United Kingdom ..... | 411/41 |

*Primary Examiner*—Neill R. Wilson
*Attorney, Agent, or Firm*—Cesarano & Kain

[57] ABSTRACT

The anchoring system includes a generally cylindrical anchor having first and second longitudinal portions. The first longitudinal portion includes a female threaded interior cylindrical chamber. The second longitudinal portion includes a lower chamber having a bore smaller than the threaded chamber. A pair of radial slots extends longitudinally through the second portion of the anchor. An elongated pin, having a length which does not exceed the second longitudinal portion of the anchor, is driven into the lower cylindrical chamber of the anchor. The pin expands the outer cross sectional dimension of the lower portion of the anchor. A male threaded screw completes the anchoring system. The threaded surface of the screw is complementary to the female threaded interior chamber.

3 Claims, 1 Drawing Sheet

ANCHOR WITH DRIVE PIN AND THREADABLE BOLT

BACKGROUND OF THE INVENTION

The present invention relates to an anchoring system which includes an anchor, a drive pin and a threadable bolt.

Anchoring systems consisting of expansion anchors are often times used to affix structures to concrete walls or floors. The following patents describe expansion anchors which usually include an anchor having a top interior cylindrical chamber with a female thread and a lower cylindrical interior chamber which expands when a threaded bolt is inserted into the interior chambers. The lower interior chambers of the known expansion bolts are permitted to expand because the inner bore of these lower chambers are smaller than the outer cross sectional dimension of the bolt threadably inserted into the anchor. The lower, outer cross sectional dimension of the anchor expands because the lower portion of the anchor includes radially extending, longitudinally extensive slots which permit the anchor to flare upon introduction of the bolt into the small bore lower chamber. The following patent disclosures illustrate these items:

| U.S. Pat. No. | Inventor | Issue Date |
| --- | --- | --- |
| 4,614,471 | Mauritz | September 30, 1986 |
| 4,662,808 | Camilleri | May 5, 1987 |
| 4,602,902 | Herb | July 29, 1986 |
| 3,171,321 | Fischer | March 2, 1965 |
| 3,516,324 | Berner | June 23, 1970 |
| 4,760,843 | Fischer et al. | August 2, 1988 |
| 3,461,772 | Barry | August 19, 1969 |
| 2,784,636 | Bohmer | March 12, 1957 |

OBJECTS OF THE INVENTION

It is an object of the present invention to provide an anchoring system which permits the bolt to be removed from the anchor after installation of the anchor in the wall.

It is another object of the present invention to provide an anchoring system which utilizes a pin which is first driven into the lower region of the anchor thereby expanding the outer dimension of the anchor and locking the anchor into the surrounding material comprising the support structure.

SUMMARY OF THE INVENTION

The anchoring system includes a generally cylindrical anchor having first and second longitudinal portions. The first longitudinal portion includes a female threaded interior cylindrical chamber. The second longitudinal portion includes a lower chamber having a bore smaller than the threaded chamber. A pair of radial slots extends longitudinally through the second portion of the anchor. An elongated pin, having a length which does not exceed the second longitudinal portion of the anchor, is driven into the lower cylindrical chamber of the anchor. The pin expands the outer cross sectional dimension of the lower portion of the anchor. A male threaded screw completes the anchoring system. The threaded surface of the screw is complementary to the female threaded interior chamber.

BRIEF DESCRIPTION OF DRAWINGS

Further objects and advantages of the present invention can be found in the detailed description of the preferred embodiment when taken in conjunction with the accompanying drawings in which.

DETAILED DESCRIPTION OF THE PREFERRED EMBODIMENT

The present invention relates to an anchor with a drive pin and a threadable bolt which defines an anchoring system.

Figure 1:
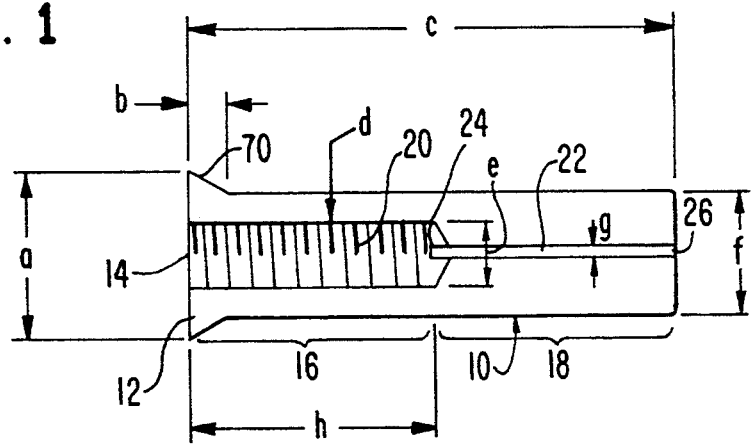
FIG. 1 diagrammatically illustrates a cross sectional view of the generally cylindrical anchor body.

FIG. 1 diagrammatically illustrates anchoring body 10 having a top end 12 which defines an opening 14. Anchor body 10 is generally cylindrical in shape. Anchor body 10 generally consists of a first or top longitudinal portion 16 and a bottom or second longitudinal portion 18. The top longitudinal portion 16 includes a female threaded interior cylindrical chamber 20. The open end 14 defines a mouth for interior chamber 20. The lower longitudinal portion 18 defines a lower cylindrical chamber 22 having a bore smaller than threaded interior chamber 20. Both interior chambers are axially aligned along the axial center line of anchor body 10. Lower chamber 22 has a upper mouth 24 which is open to the lower region and lower end of threaded chamber 20. Lower chamber 22 has a lower mouth or opening 26 that is open to the environment or to the subsurface after the anchor body 20 is mounted therein. In a preferred embodiment, lower chamber 22 is a smooth bore.

Figure 2:
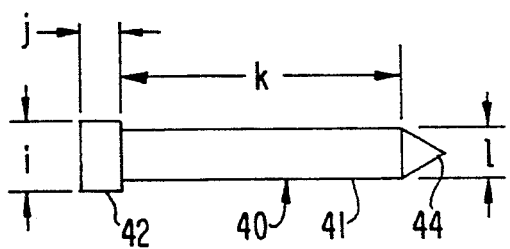
FIG. 2 diagrammatically illustrates the elongated pin which is driven into the lower portion of the anchor; and, FIG. 3 diagrammatically illustrates the anchoring system mounting an L-shaped bar onto a concrete slab.

FIG. 2 diagrammatically illustrates an elongated pin 40 having a cross sectional dimension 1 which is larger than the cross sectional dimension g of lower chamber 22. Pin 40 also includes a head 42 which has a cross sectional dimension substantially similar to the cross sectional dimension e of threaded chamber 20. Pin 40 further includes a body portion 41 having a length k which does not exceed the longitudinal extent or length of the lower portion 18 of anchor body 10. In other words, end 44 of pin 40 is designed not to protrude significantly beyond bottom opening 26 of anchor body 10.

Since pin 40 has a cross sectional dimension 1 which is larger than the cross sectional dimension g of the lower, small bore chamber 22, when pin 40 is inserted into that lower chamber, the outer cross sectional dimension f of lower body portion 18 of anchor body 10 expands.

Figure 3:
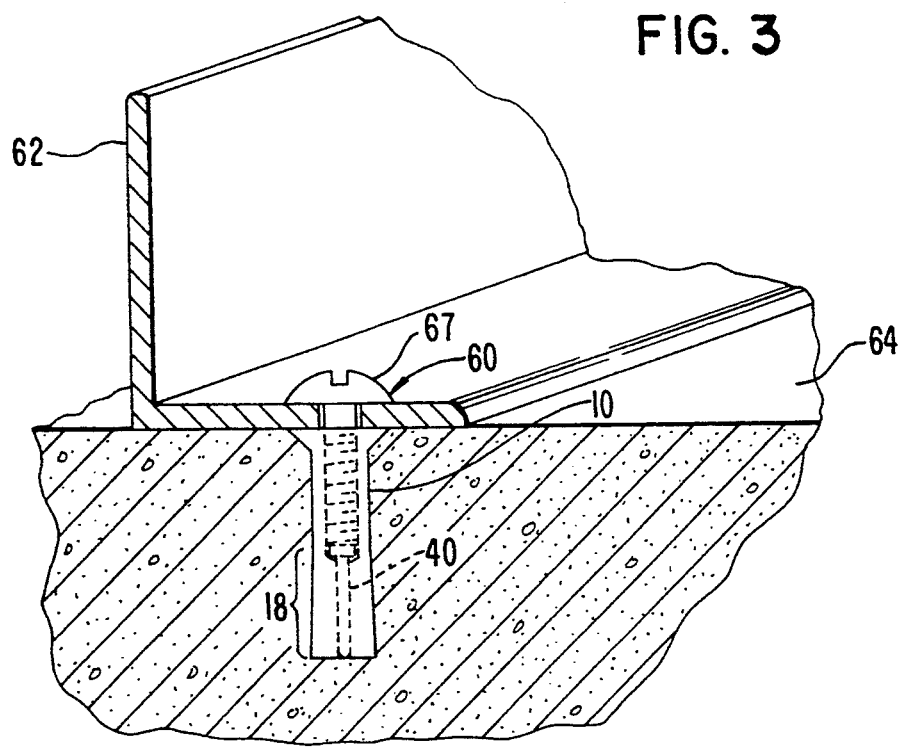

FIG. 3 diagrammatically illustrates anchoring system 60 securely mounting L-shaped bar 62 into a concrete slab 64. A hole is drilled into slab 64 in the appropriate size. This size is slightly larger than the cross sectional outer dimension f of anchor body 10. Thereafter, pin 40 is inserted into anchor body 10 and is driven into the lower portion 18 of the body. This causes the lower portion 18 of anchor body 10 to radially expand thereby gripping the sides of the hole in concrete 64. Thereafter, a male threaded screw 67 is threaded into upper chamber 20 and is further utilized to attach bar 62 or any other structure to concrete slab 74.

The most important feature of the present anchoring system involves the removability of screw 64 from anchor body 10 without loosening the anchor body itself.

The exemplary dimensions table below provides some exemplary dimensions for the anchor body and pin.

| Exemplary Dimensions Table | |
|---|---|
| Anchor | |
| a | 0.500 inches |
| b | 0.125 |
| c | 1.500 |
| d | ¼-20 |
| e | 0.201 |
| f | 0.375 |
| g | 0.062 |
| h | 0.750 |
| Pin | |
| i | 0.201 |
| j | 0.125 |
| k | 0.750 |
| l | 0.156 |

In one use, the user drills ⅜" diameter hole approximately 2" deep in concrete slab 64. The user then places anchor body 10 in the hole and then drives the pin 40 (which could be a nail) with a punch into the lower portion 18 of anchor body 10. The pin or nail is driven into the anchor until it is substantially disposed within lower chamber 22. Head 42 of pin 40 seats on and about mouth 24 of lower chamber 22. In this position, the anchor body is securely mounted within the concrete hole but the screw 67 can be removably inserted into the anchor body.

Tests have shown that this type of anchor body holds 1,200 pounds. Further, it cannot be installed backwards. The hole depth is not as critical as with customary or prior art anchor systems. The anchor system can be made out of aluminum, stainless steel or other types of steel.

As a further enhancement to the anchor system, anchor body 10 includes a radially flared upper lip 70 about top opening 14. This lip 70 or head enables the anchor to be flush mounted at the surface of concrete slab 64.

The claims appended hereto are meant to cover modifications and changes within the spirit and scope of the present invention.

What is claimed is:

1. An anchoring system comprising:

a generally cylindrical anchor having an open top end leading to a female threaded interior cylindrical chamber extending through a first longitudinal upper portion of said anchor, said anchor including a radially flared and outwardly extending top lip adjacent to said top end, a lower cylindrical chamber having a smooth bore and having a diameter less than one-half of the diameter of said threaded interior chamber and extending from said first upper portion and through a second lower longitudinal portion of said anchor, said first and second longitudinal portions substantially spanning the length of said anchor, said anchor having a substantially constant outer diameter, and a pair of radial slots extending longitudinally through said second lower longitudinal portion of said anchor said radial slots extending approximately the length of said smooth bore;

an elongated pin having a length which is substantially equivalent to said second lower longitudinal portion of said anchor, and said pin having an outer, cross sectional dimension which is substantially constant along its length and larger than said smooth bore of said lower cylindrical chamber, said pin including a head, said head having a cross-sectional dimension which is substantially equivalent to equal to a cross-sectional dimension of said upper longitudinal chamber, said pin adapted to be driven into said lower cylindrical chamber thereby radially expanding substantially the entire outer cross-sectional dimension of said second lower longitudinal portion of said anchor a substantially uniform radial distance along its entire length; and, a male threaded screw having a threaded surface which is complementary to said female threaded interior cylindrical chamber of said anchor.

2. An anchoring system as claimed in claim 1 wherein said pair of radial slots define a plane through an axial centerline of said anchor.

3. An anchoring system as claimed in claim 2 wherein said elongated pin is a conventional nail.

* * * * *